Figure 1:
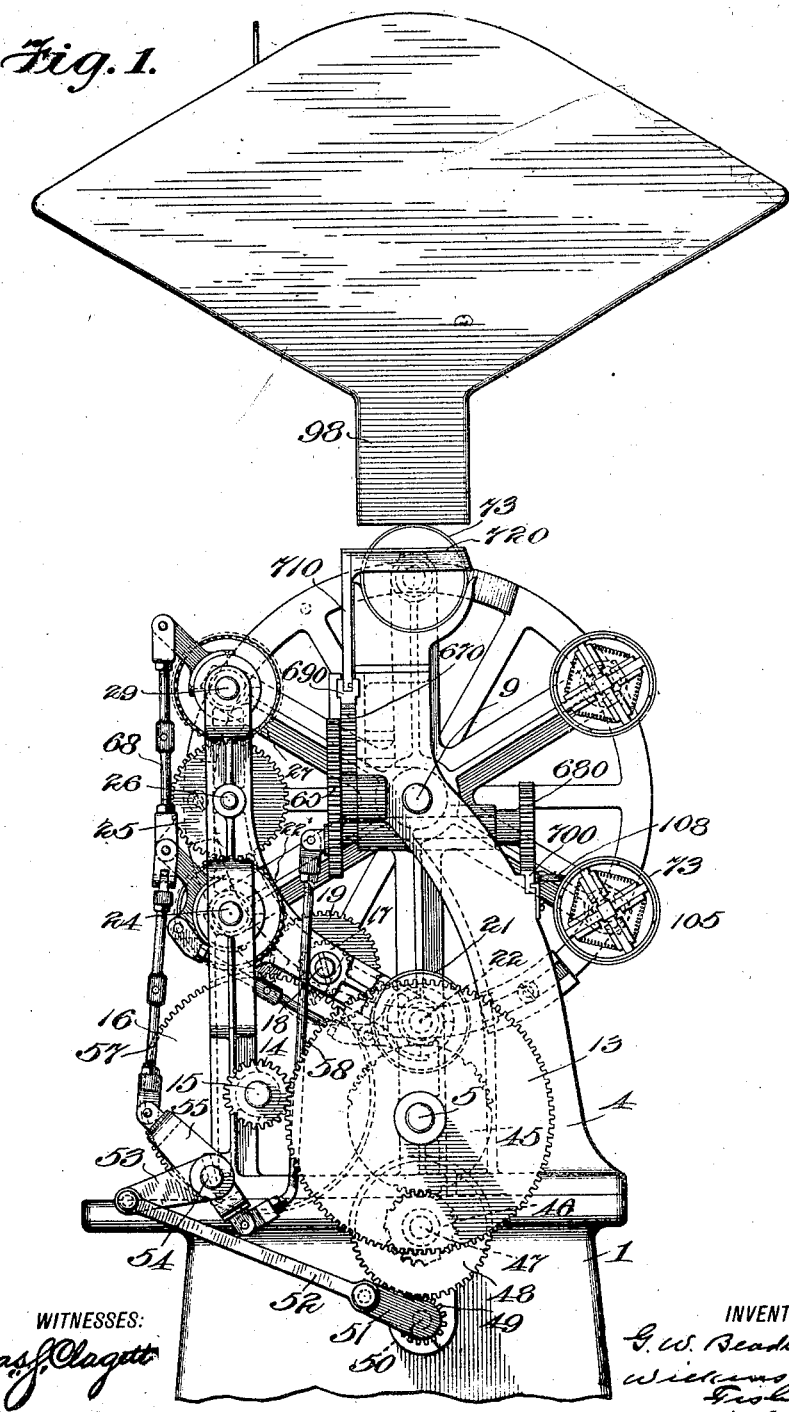

G. W. BEADLE.
CRIMPING MACHINE FOR CARTONS.
APPLICATION FILED JUNE 2, 1910.

1,133,424.

Patented Mar. 30, 1915.
9 SHEETS—SHEET 1.

WITNESSES:

INVENTOR
G. W. Beadle
by Wickinson
Fisher &
Wickinson
ATTORNEYS

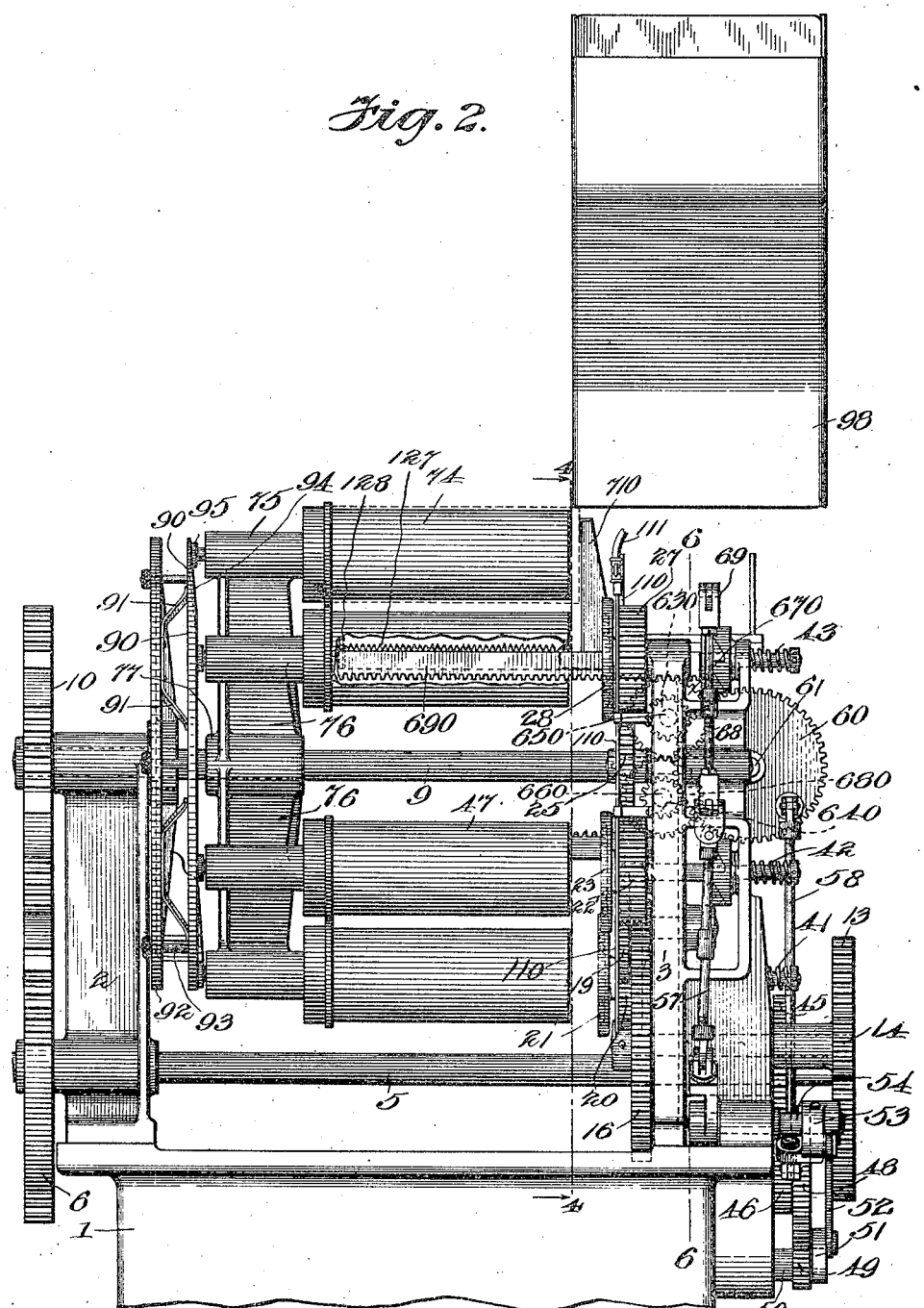

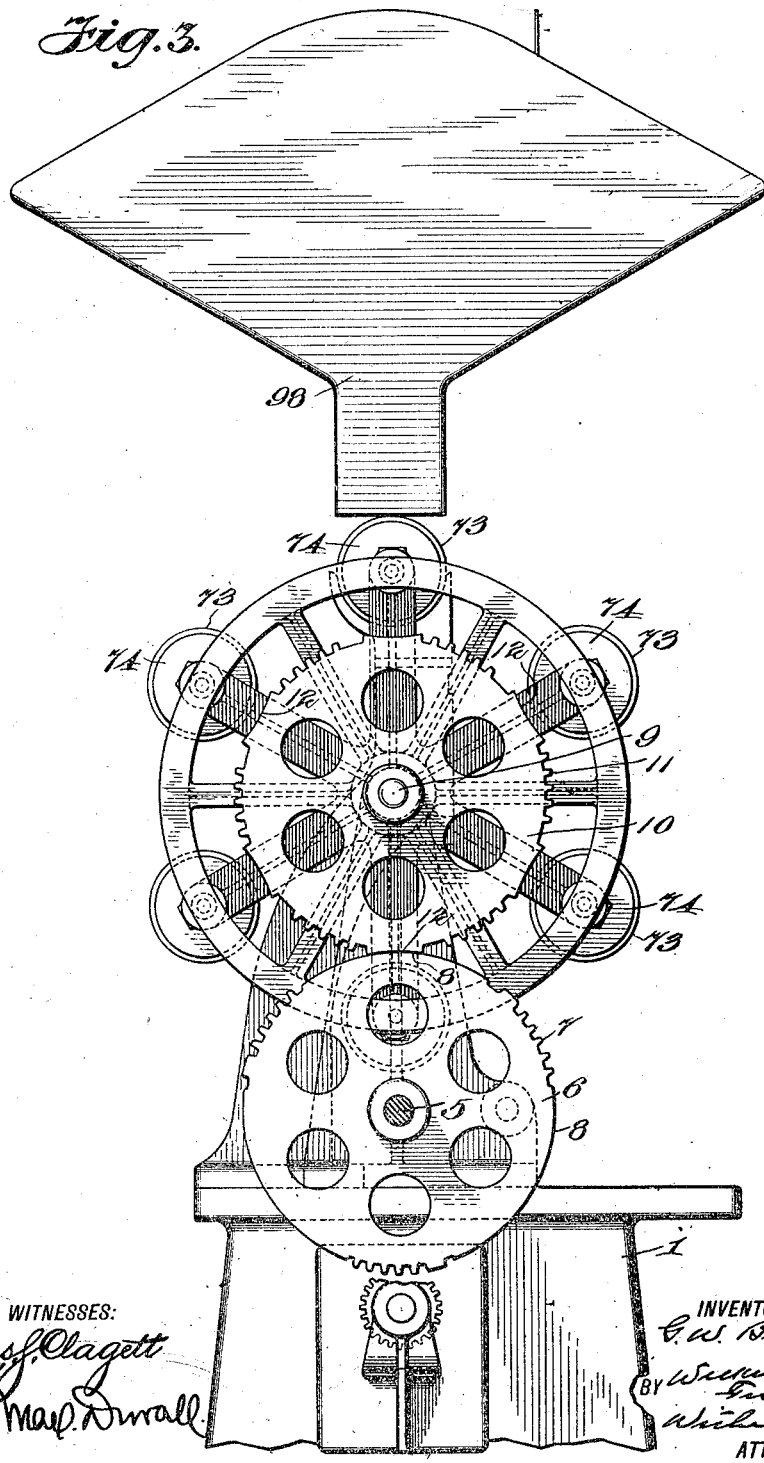

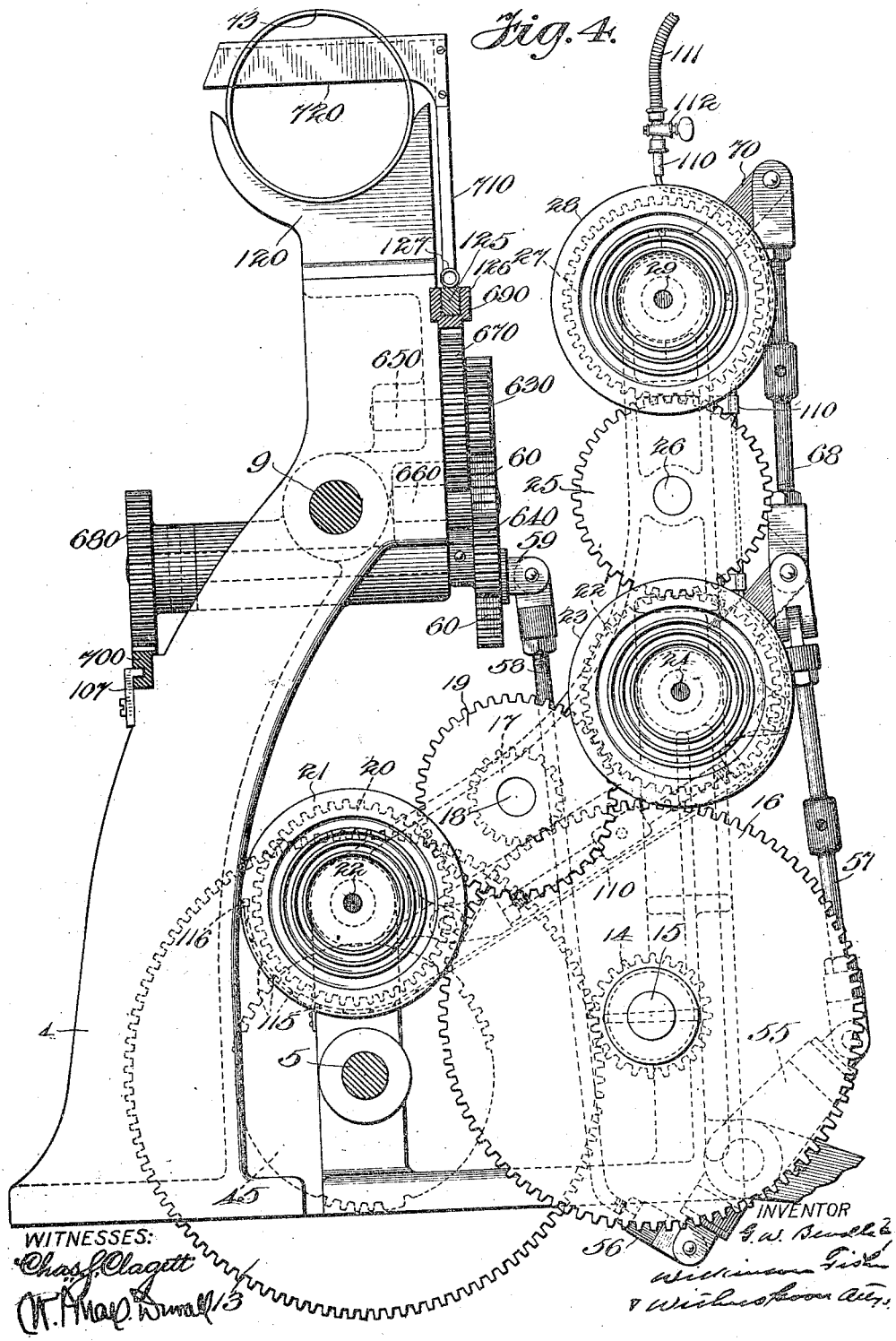

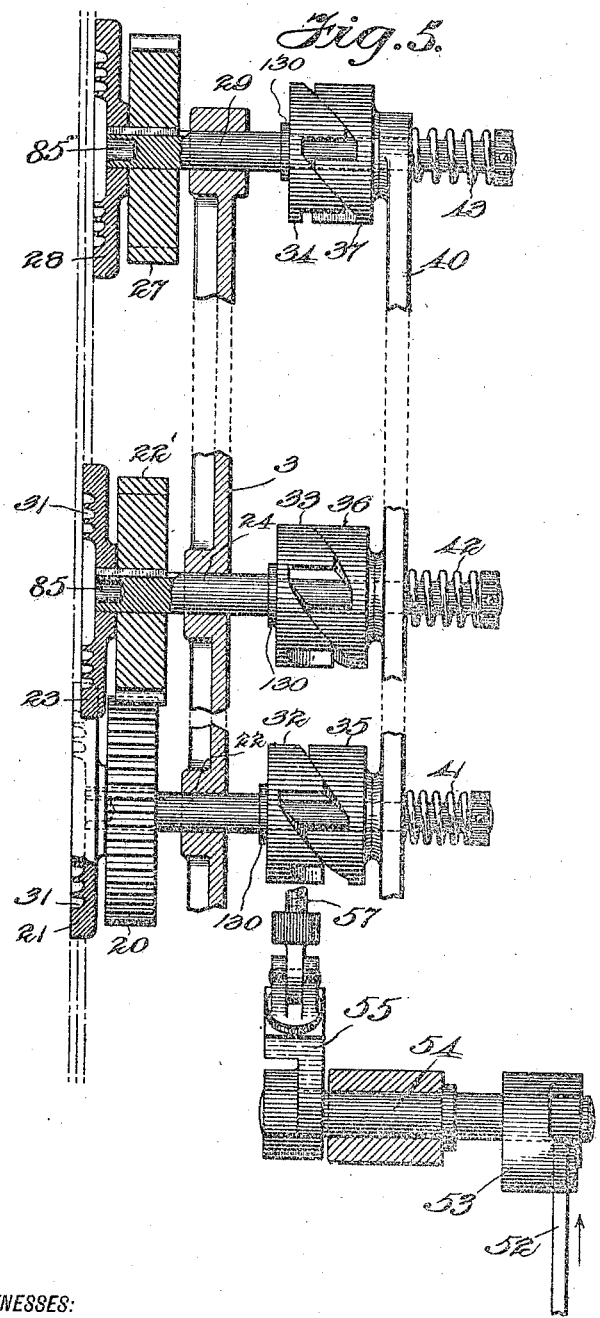

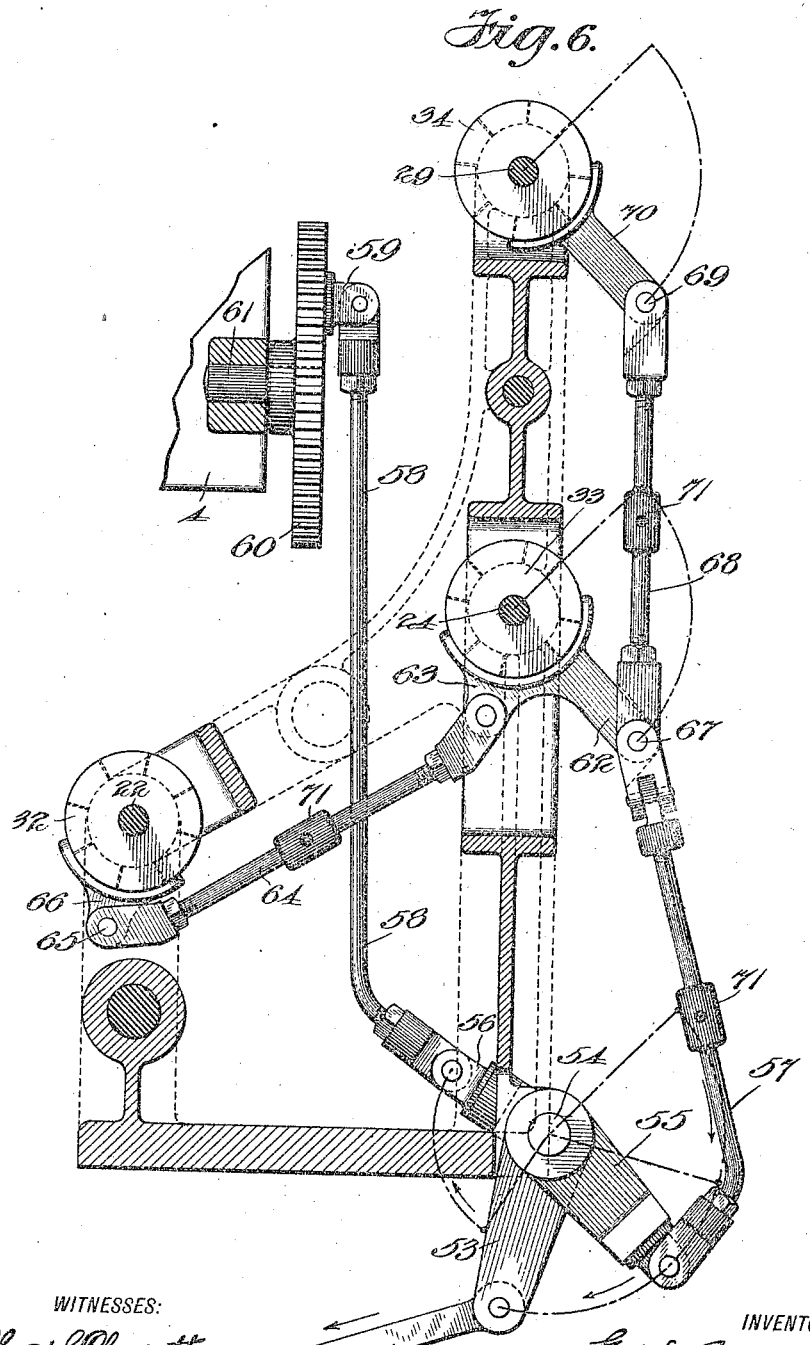

G. W. BEADLE.
CRIMPING MACHINE FOR CARTONS.
APPLICATION FILED JUNE 2, 1910.
1,133,424.
Patented Mar. 30, 1915.
9 SHEETS—SHEET 7.
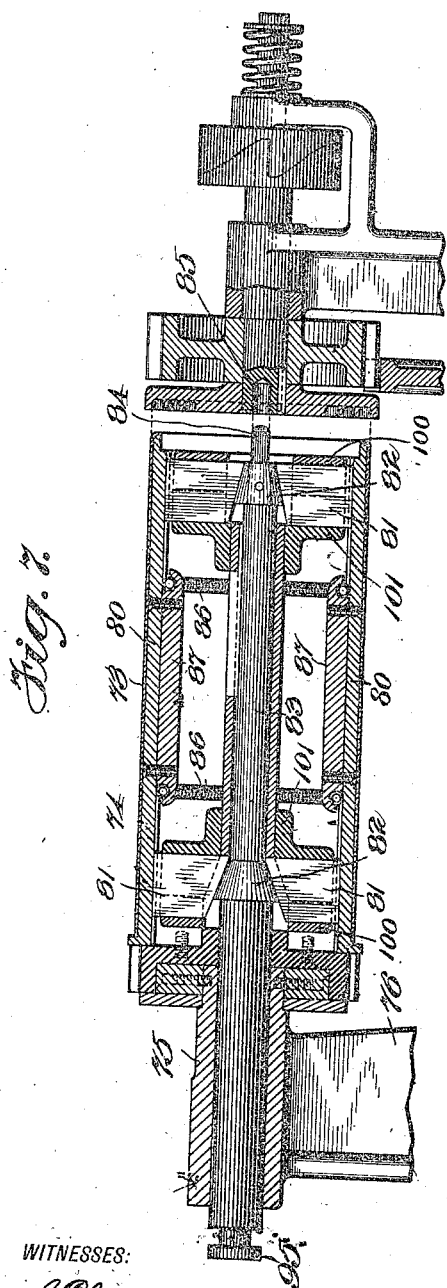
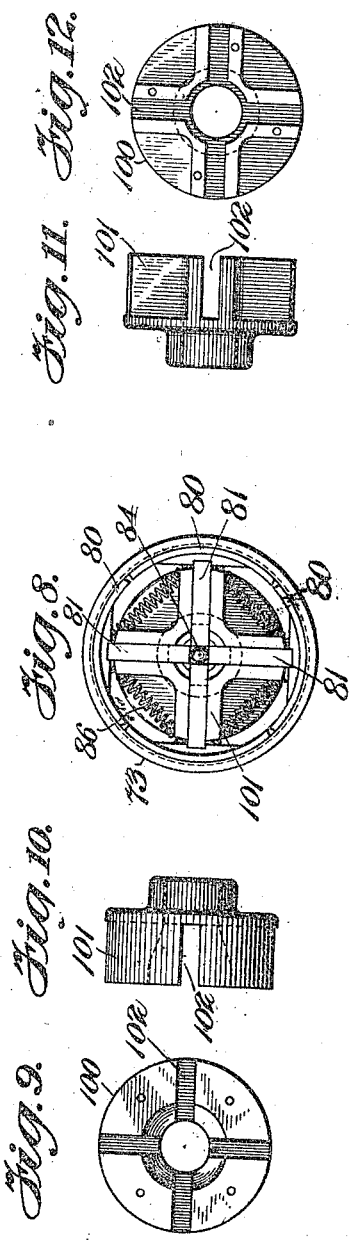

G. W. BEADLE.
CRIMPING MACHINE FOR CARTONS.
APPLICATION FILED JUNE 2, 1910.
1,133,424.
Patented Mar. 30, 1915.
9 SHEETS—SHEET 8.
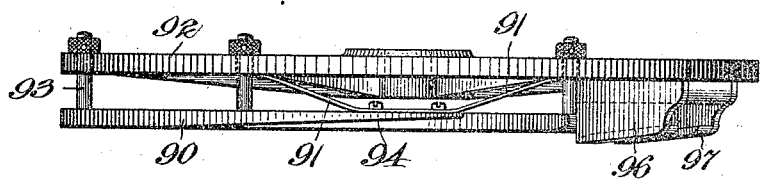
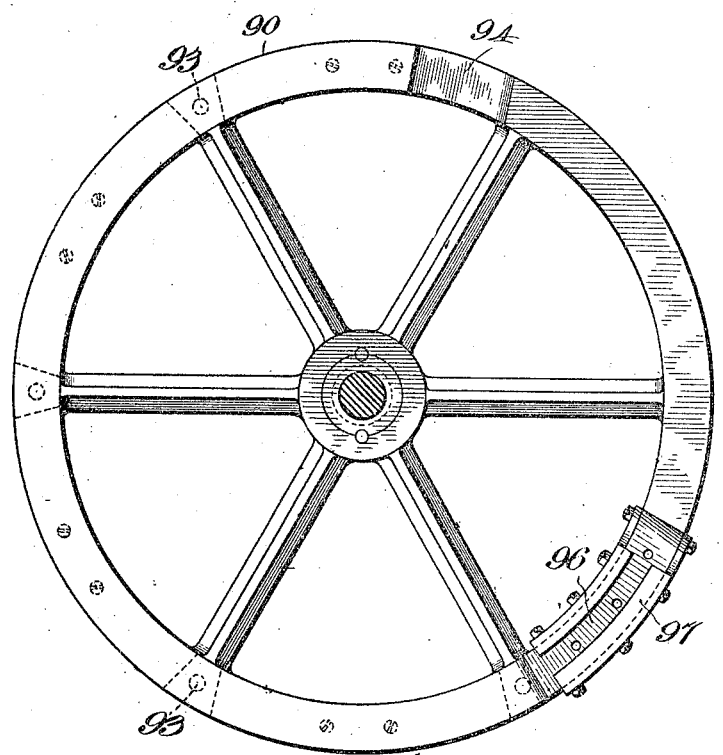
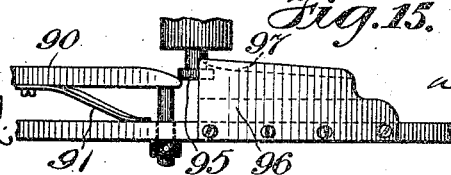

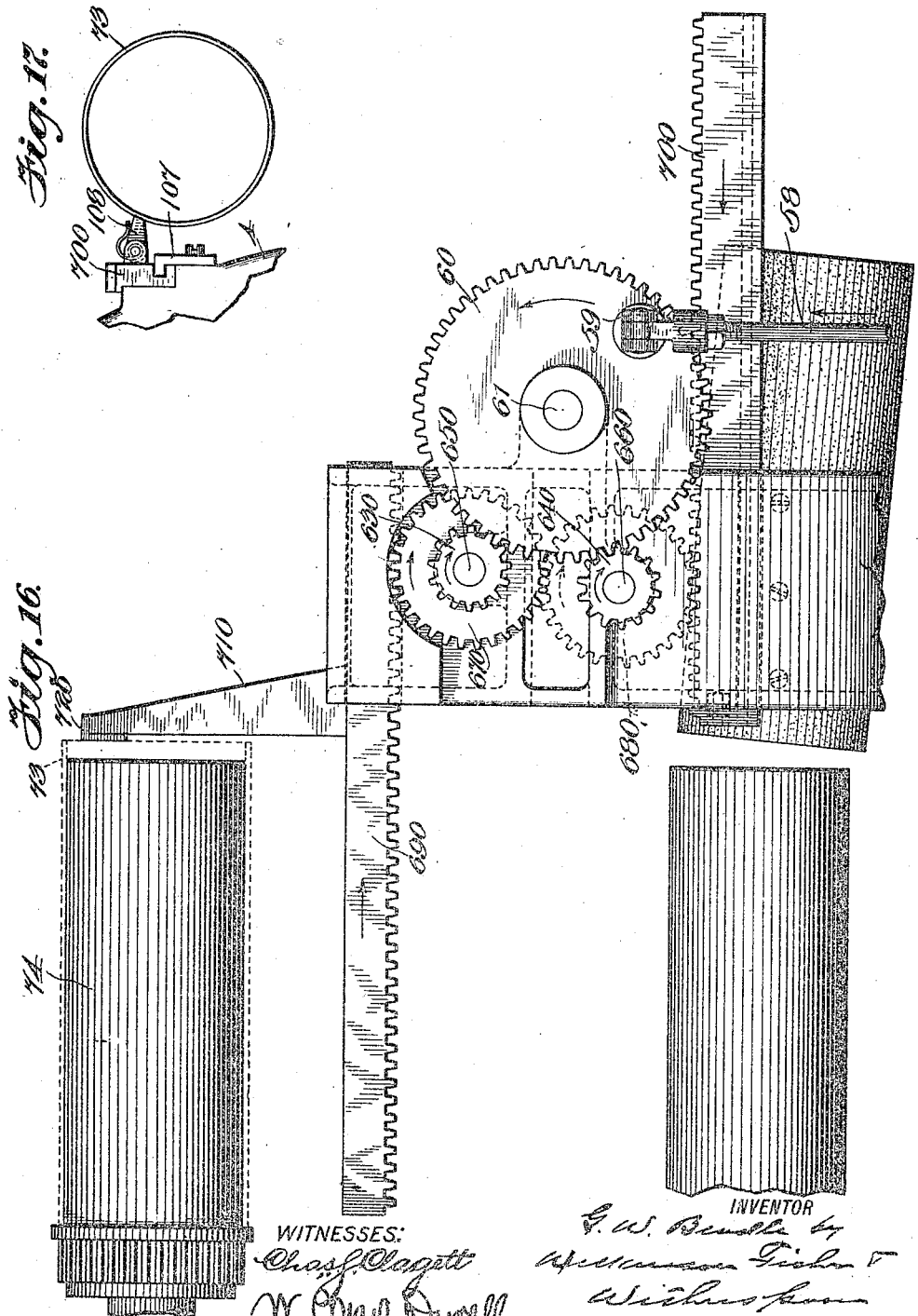

UNITED STATES PATENT OFFICE.

GEORGE W. BEADLE, OF MONTCLAIR, NEW JERSEY, ASSIGNOR TO SINGLE SERVICE PACKAGE CORPORATION OF AMERICA, OF NEW YORK, N. Y., A CORPORATION OF NEW JERSEY.

CRIMPING-MACHINE FOR CARTONS.

1,133,424. Specification of Letters Patent. Patented Mar. 30, 1915.

Application filed June 2, 1910. Serial No. 564,602.

*To all whom it may concern:*

Be it known that I, GEORGE W. BEADLE, a citizen of the United States, residing at Montclair, in the county of Essex and State of New Jersey, have invented certain new and useful Improvements in Crimping-Machines for Cartons; and I do hereby declare the following to be a full, clear, and exact description of the invention, such as will enable others skilled in the art to which it appertains to make and use the same.

This invention relates to machines for crimping the ends of vessel bodies, and has for its object to produce a mechanism which will be certain in action and which will perform its functions continuously and at a high rate of speed.

To these ends, the invention consists in the novel details of construction and combinations of parts more fully hereinafter disclosed and particularly pointed out in the claims.

Referring to the accompanying drawings forming a part of this specification in which like numerals refer to like parts in all the views:—

Figure 1, is an end view of the work end of the machine where the crimping of the carton takes place, and shows the feed hopper for feeding the tubes to be crimped; Fig. 2, is a side view of the machine showing the mandrels and the tube in dotted lines upon a mandrel previous to its first or initial crimping or spinning; Fig. 3, is a view of the machine taken at the opposite end from that shown in Fig. 1, and shows the two main intermittent driving gears in their relation to each other; Fig. 4, is an enlarged detail sectional view upon the line 4—4 of Fig. 2, looking in the direction of the arrows, and showing the driving gears of the three progressive crimpers or spinners, and also the two racks and their gears for feeding and ejecting the unfinished and finished tubes; Fig. 5, is a diagrammatic view illustrating the advanced positions of the three progressive crimpers or spinners, the broken lines illustrating the three crimping or spinning operations to which the tube is subjected at three different points in its travel; Fig. 6, is a detail view taken on the line 6—6 of Fig. 2 showing the crimping or spinning members in about the positions disclosed in Fig. 5, and also the adjustable toggle members for accomplishing operations upon three tubes simultaneously; Fig. 7, is a vertical central section of a mandrel of the type used, showing its co-action with the crimping or spinning disks and a part of its gearing; Fig. 8, is an end view of a mandrel looking from the front of the machine; Figs. 9, 10, 11 and 12, are detail views of parts of the mandrel; Figs. 13, 14 and 15, are detail views of the cam ring for expanding the mandrels; Fig. 16, is a detail view enlarged of the driving gears and racks for feeding the tubes to the mandrels and removing them from the same; and, Fig. 17, is a fragmentary detail view showing the ejecting rack with its spring dog for engaging and positively removing a finished tube from a mandrel at the completion of the crimping or spinning operation.

1 indicates any suitable support on which are mounted standards 2 and 3, Fig. 2, and the auxiliary standard 4, Fig. 4. Journaled in the standards 2 and 3 is the main drive shaft 5 carrying at one end the drive wheel 6 provided at intervals with teeth 7 and clear spaces 8. Located above the shaft 5 is a second shaft 9 journaled at one end in the standard 2 and at the other end in the auxiliary standard 4. This shaft 9 carries a wheel 10 provided at intervals with teeth 11 adapted to intermesh with the teeth 7 and clear spaces 12 between the teeth 11 over which clear spaces the clear spaces 8 on the wheel 6 are adapted to slide and thereby lock the wheel 10, for a purpose that will appear below.

On the shaft 5 at the end opposite to the end carrying the wheel 6 is a gear wheel 13, see Figs. 2 and 4, which wheel intermeshes with the pinion 14 carried by the stud 15 on which is mounted the gear wheel 16 intermeshing with the pinion 17 carried by the stud 18 on which is mounted the gear wheel 19 intermeshing with the gear wheel 20 rigid with the crimping cam 21 carried on the stud 22, for a purpose which will also be more fully explained below. The gear wheel 19 also intermeshes with the gear wheel 22' rigid with the crimping cam 23 carried on the stud 24; and said gear wheel 22' intermeshes with the gear wheel 25 mounted on the stud 26. The gear wheel 25 in turn intermeshes with the gear wheel 27 rigid with the crimping cam 28 mounted on the stud 29, all as is clearly shown in Fig. 4.

From the structure now disclosed, it is evident, that power transmitted through the shaft 5 will be also transmitted through the train of gears described to turn the crimping disks 21, 23 and 28. These disks, as best shown in Fig. 5, are provided with a plurality of concentric cam-like depressions 31 in their faces for operating on different sized cartons, and their respective studs 22, 24 and 29 carry clutch-like cam disks respectively numbered 32, 33, and 34 mounted loosely on their studs and these latter disks respectively, engage similar clutch-like cam disks 35, 36 and 37 also loosely mounted upon the studs aforementioned but which are rigid with the frame 40 which is an extension of the standard 3.

It is evident that as the respective crimping disks 21, 23 and 28 are revolved by the mechanism above disclosed that the studs 22, 24 and 29 will turn in their clutch-like cam disks 32, 33 and 34. But if an independent motion is given said clutch disks, as will be described below, said studs will be moved longitudinally against the tensions of the springs 41, 42 and 43, surrounding the ends of said studs, and said studs will in turn give said crimping disks a corresponding transverse movement. This transverse motion will be transmitted through the collars 130 carried by the studs and will also be imparted while the said crimping disks are revolving, as will be again referred to hereinafter.

On the shaft 5 near the gear 13 is an intermittent gear 45 which intermeshes with a similar gear 46 carried by the stud 47 and this stud carries a larger gear 48 intermeshing with the pinion 49 carried by the stud 50, as best shown in Figs. 1 and 2. The stud 50 also carries the crank arm 51 to which is pivoted the link 52 connected to the crank 53 carried by the stud 54, see Fig. 6. The stud 54 also carries main crank arms 55 and 56 to which are respectively connected the rods 57 and 58, as shown. The rod 58 is connected by the lug 59 to the gear 60 mounted on the stud 61, journaled in the auxiliary standard 4. The rod 57 is connected to the crank arm 62 carried by the clutch-like cam disk 33 mounted on the stud 24. Rigid with the arm or lever 62 is a second similar lever or arm 63 to which is connected the link 64 which is connected as at 65 with a lever or arm 66 carried by the clutch-like cam 32 on the stud 22. Connected with the arm or lever 62 as at 67 is a rod 68 joined as at 69 to the lever or arm 70 carried by the clutch-like cam 34, mounted on the stud 29.

It is evident from the mechanism just described that if the pinion 49 is given an intermittent rotation through the connections disclosed with the power shaft 5, that the crank 51 will also be given an intermittent rotation while the arms or levers 53, 55, 62, 63, 66, and 70, will be given oscillating motions, provided, of course, the connecting rods 57, 64 and 68 are of the proper length for such oscillating movements. In order to insure that these connecting rods shall be just the proper length, they may be adjustable as indicated at 71. Of course, an oscillating movement of the clutch-like cam disks 32, 33 and 34 will impart a reciprocating longitudinal movement to the studs 22, 24, and 29 above referred to, and if a paper carton is in engagement with one of the grooves 31 in the cam crimping disks 21, 23 and 28, it is evident that said disks will turn in or crimp the edges of said carton while they are being continuously rotated through the gears 20, 22' and 27, and that, therefore, the edges of said cartons will be spun inward or permanently set, so as to make the inner diameter of the tubular body smaller at the end operated upon than it is at the other end. It is also evident if the rod 58 is made of the proper length that the gear 60 will be given an oscillating movement on the stud 61, in unison with the arm or lever 56.

The gear 60, see Figs. 2, 4, and 16, intermeshes with the pinions 630 and 640 on the studs 650 and 660 respectively, and mounted on the stud 650 is the gear 670 while mounted on the stud 660 is the gear 680. The gear 670 intermeshes with the longitudinal reciprocating rack 690 and the gear 680 intermeshes with an oppositely timed rack 700. The rack 690 carries a finger or feeder bar 710 provided with a cross bar 720, see Fig. 4, adapted to engage the cartons or vessel bodies 73 and to force the same upon the mandrels 74. There are a plurality of these mandrels 74 which are mounted upon the bearings 75 carried by the arms 76 of a spider 77 mounted on the shaft 9. These mandrels are preferably chosen of an expanding type, in order that when the cartons 73 are forced thereover by the bar 720 they will expand when on the inside of said cartons and hold the same firmly for the crimping operation which is to follow.

As best shown in Figs. 7 to 12, the outer cylindrical portion of the mandrel is divided into segmental parts 80 which parts are forced outward by means of the radially moving wedges 81 when acted upon by the cam surfaces 82 carried by the axle 83 of the mandrel as will appear more fully below. One end 84 of the mandrel axle 83 is reduced, as shown, and fits into a socket 85 in the crimping disks, as best shown in Fig. 7, in order to form a firm support for the mandrel. When the axle rod 83 is retracted, the springs 86 connected to the segmental pieces 87, retract the same, and since said segmental pieces 87 are in turn secured to the outer cylindrical portions 80 of the mandrel the said springs 86 cause the mandrel to contract when said axle rod 83 is withdrawn, as will be readily understood.

The radially moving wedge pieces 81 are conveniently carried between the cylindrical pieces 100 and 101 rigid with the tubular center through which the mandrel axle 83 operates, and these members are provided with the registering slots 102, between which said wedges 81 fit, as will be readily understood. In order to reciprocate the axle rods 83 longitudinally in the mandrels, I provide on the shaft 9 a cam ring 90 cushioned by the springs 91 bearing against the disk or ring 92 and said cam ring 90. Said cam ring 90 is supported from the ring 92 by the studs 93, as best shown in Figs. 2, 13, 14, and 15.

The cam ring 90 is provided with an inclined surface 94 adapted to receive the projecting ends 95 of the mandrel axles 83, and to yieldingly force said axles inwardly in order to expand the mandrels. The extreme end 95 of the mandrel axles is of a button-like shape, as best shown in Fig. 15, and the cam ring 90 is provided with the cam way 96 having overhanging parts 97 adapted to engage the button-like portions of the axle ends and to thereupon force said axles in the opposite direction and permit the springs 86 to contract the mandrel. The gears shown on the mandrels in Figs. 7 and 16 have no utility in this machine when not using a printing attachment but said gears serve to engage a portion of such attachment when it is applied to this machine, as illustrated in my co-pending application Serial Number 573,312 filed July 22, 1910, now Patent #996,827, dated July 4, 1911.

From the construction now disclosed, it is evident that assuming vessel bodies 73 to be suitably dropped from the reservoir 98, see Fig. 3, and to be forced over the mandrels 74 by the feeder 710, it is obvious that power being transmitted through the shafts 5 and 9, the operation will be as follows: The mandrels will be rotated through the intermittent gears 6 and 10 to positions opposite the cam crimping disks 21, 23, and 27, whereupon the smooth portions 8 and 12 of said gears will engage, as clearly illustrated in Fig. 3, and positively lock the mandrels in said crimping positions. While the mandrels and cartons are thus firmly locked or held in position, the train of gearing actuated by the gear 13 on the shaft 5 will cause said cam crimping disks to push or bend in the contacting edges of the cartons, while said cam disks are being rapidly rotated, as will be readily understood.

It will further be evident when a carton leaves the crimping disk 28 it will pass on and later become engaged with the crimping disk 23 and still later become engaged with the crimping disk 21, and so on, so that the crimping of the cartons is gradual and certain. During this operation the cam ring 90 will have forced the axle rod 83 inwardly and have so expanded the mandrel as to hold the cartons firmly in position. After the crimping has been accomplished, however, the said cam disk 90 will have withdrawn the axle rod and thereby permitted the mandrel to become collapsed. As the spider and mandrels continue to revolve the collapsed mandrel will at the point 105, Fig. 1, be in condition to have the finished tube discharged. In order to accomplish this, the rack bar 700, see Figs. 4 and 17, is securely held to the standard 4 by means of the bracket 107 and is provided with a spring controlled toe or dog 108 which frictionally engages the carton 73 and positively pulls the same off of the mandrel.

While the crimping operation is going on, in order that the edges may be more smoothly and permanently set it is desirable to heat the material being crimped. To accomplish this I provide a gas pipe 110 fed from any suitable supply 111 controlled by the cock 112, and I pass this pipe 110 around a portion of the circumference of each crimping cam disk 28, 23, and 21, as shown. The pipe 110 is provided with numerous perforations 115 which causes the same to act as a burner when the cam disks are to be heated, as will be readily understood. The end 116 of this pipe is closed by any suitable means, as by a cap.

When the cartons are dropped from the reservoir 98 in front of the feeder bar 710, they are received in the tube holder 120, as best shown in Fig. 4, and when said cartons are pushed forward by the feeder 710, unless the mandrels are in exact register with said tube holder, there will be a severe strain brought on the cross bar 720 which, were it not provided for, might injure the machine. In order to prevent any injurious effects from the lack of registration between the mandrels and the receiver 120 I preferably provide the feeder 710 with a foot 125 and mount the same in a slot 126 in the rack bar 690, as best shown in Fig. 4, so that the feeder 710 may freely slide in the rack bar 690. I also connect the foot 125 with the extreme end of the rack 690 as by a spring 127 fastened to the pin 128 carried on the end of said rack 690, as will be seen from Fig. 2. It is evident from this construction that when an undue strain comes upon the feeder bar 710 the spring 127 will be stretched until the mandrel 74 comes in exact registration with the carton receiver 120, whereupon the said spring will restore the parts to their normal positions.

The full operation of the machine will be clear from the foregoing, but it may be briefly summarized, as follows:—Power is continuously applied to the main drive wheel 6, the teeth 7 of which engage at regular intervals with teeth 11 on the wheel 10, mounted on the shaft 9, and which intermittently revolves the mandrels 74 around the shaft 9. The said mandrels between their periods of movement are firmly locked in position by the interengaging smooth parts 8 and 12 on the wheels 6 and 10, and during these locking periods the cartons are operated upon, as will be now described. The said cartons are fed from the reservoir 98 into the curved receiver 120, whereupon the rack 690 forces the said cartons upon the mandrels 74, and when said mandrels begin their periods of movement the cam ring 90 forces the axles 83 of said mandrels inwardly, thus expanding the mandrels and firmly gripping the cartons. The first carton is brought opposite the cam crimping disk 28 which, by the mechanism above disclosed, is forced longitudinally of its stud and said carton, thus turning or crimping the edges of the carton while subjecting it to a rotary or spinning motion all the time. This spinning motion, of course, only continues during the period the mandrel 74 is locked by the contacting smooth surfaces 8 and 12 on the wheels 6 and 8, as above mentioned. During the next brief movement of the mandrels the cam spinning disk is retracted, another carton is forced over another mandrel and the first carton is brought down and is operated upon in a similar manner by the cam spinning disk 23, while the cam spinning disk 28 operates upon the said second carton. In the same way a third carton is slipped over a third mandrel and the three cartons are operated upon by the cam spinning disks 21, 23 and 28, in the order in which they were placed over the said mandrels. Each successive operation by the cam spinning disks upon the cartons is with a greater pressure and may be at a higher speed. While these various operations upon the cartons are going on simultaneously, if desired, the gas in the pipe 110 is burning and the said cam spinning or crimping disks are heated, so that the material of the cartons is firmly, smoothly and permanently set.

Of course there may be as many mandrels and cam spinning disks as desired, and also, it is evident, that the machine may be run at a very high speed and for the reason that the cartons are so firmly held by the expanded mandrels that there is no possible chance of their getting away from the operation or of the operation failing in any given instance.

After the crimping operation has been carried as far as is desired the finished carton will be carried by its mandrel to some point, as 105, see Fig. 1, whereupon, the reciprocating spring controlled dog 108, carried by the rack 700 will force the carton off of the now collapsed mandrel and drop it into any suitable receptacle, not shown.

It is evident that those skilled in the art may vary the details of construction and the arrangement of parts, without departing from the spirit of my invention and, therefore, I do not wish to be limited to such features except as may be required by the claims.

What I claim is:—

1. In a machine for crimping the ends of tubular bodies, the combination of a drive wheel; a shaft driven by said wheel; a gear carried by said shaft; a grooved crimping disk; a reciprocating shaft on which the same is mounted; a second gear carried by said reciprocating shaft; connections between said first and second gears, by which said disk may be rotated by said first named shaft; means carried by said reciprocating shaft for moving the same while said disk is being rotated; a mandrel for carrying said bodies into position to be acted upon by said crimping disk; and connections between said mandrel and drive wheel for operating said mandrel, substantially as described.

2. In a machine for crimping the ends of tubular cartons, the combination of a driving gear; a power shaft driven by said gear; a second gear carried by said shaft; a grooved crimping disk; a movable shaft on which said disk is mounted; a third gear carried by said movable shaft; gear connections between said second and third gears whereby said disk and movable shaft may be rotated from said power shaft; cam means carried by said movable shaft for reciprocating the latter while being rotated by said power shaft; a third shaft; a mandrel carried by said third shaft adapted to properly position said cartons for being acted upon by said crimping disk; and means comprising intermittent gears connecting said third shaft and said driving gear, substantially as described.

3. In a machine for crimping the ends of tubular cartons, the combination of a power shaft; a gear wheel on said shaft; a crimping disk; a rotating and reciprocating shaft on which said disk is mounted; a second gear carried by said last named shaft; gear connections between said first and last named gears by which said second shaft and disk may be rotated from said power shaft; a cam and coacting means carried by said second shaft for reciprocating said disk and second shaft during their rotary movements; a third shaft; a mandrel carried by said third shaft mounted for revolving therearound; and intermittent gear connections provided with interlocking curved surfaces between said power shaft and said third shaft by which said mandrel is caused to bring cartons located thereon to position to be acted upon by said crimping disk, substantially as described.

4. In a machine for crimping the ends of cartons, the combination of a power wheel provided with gear teeth at intervals around its circumference and with convex smooth surfaces between said gear teeth; a second power wheel provided with gear teeth at intervals around its circumference adapted to intermesh with said first mentioned teeth and with concave smooth surfaces between said teeth adapted to contact with said convex surfaces; a crimping means for said carton; a reciprocating and rotating shaft on which said crimping means is mounted; a gear and a cam carried by said shaft; a train of gears connected to said last named gear; a power shaft connected to said first mentioned power wheel for operating said train of gears and thereby reciprocating and rotating said crimping means; and a mandrel driven by said second power wheel for bringing said carton into position for being crimped, substantially as described.

5. In a machine for crimping the ends of cartons the combination of a power wheel provided with teeth at intervals around its circumference and with convex smooth surfaces between said gear teeth; a second power wheel provided with gear teeth at intervals around its circumference adapted to intermesh with said first mentioned teeth and with concave smooth surfaces between said teeth to contact with said convex surfaces; a crimping means for said carton; connections between said means and said first mentioned wheel for rotating said crimping means; gear connections between said first power wheel and said crimping means for forcing said crimping means against said carton; an expansible mandrel driven by said second wheel for bringing said carton into position for being crimped; and means also driven by said second wheel for expanding said mandrel, substantially as described.

6. In a machine for crimping cartons, the combination of an expansible mandrel; means for revolving the same about an axis to predetermined positions; means for forcing a carton over said mandrel when in one of said positions and while in its collapsed condition; means for expanding said mandrel after it has entered said carton; and rotatable non-revolving means for crimping the end of said carton after said mandrel has been expanded, substantially as described.

7. In a machine for crimping cartons, the combination of an expansible mandrel; automatic reciprocating means for forcing a carton over said mandrel while in its collapsed condition; automatic means for expanding said mandrel after it has entered said carton; and automatic non-revolving means for crimping the end of said carton after said mandrel has been expanded, substantially as described.

8. In a machine for crimping cartons, the combination of an expansible mandrel; a longitudinally movable axle on which said mandrel is mounted; radially movable wedges for expanding said mandrel controlled by said axle; automatic means comprising a cam ring for reciprocating said axle; means for revolving said mandrel about an axis; and non-revolving means timed with said automatic and revolving means adapted to force a carton over said mandrel before said axle is moved, substantially as described.

9. In a machine for crimping cartons, the combination of an expansible mandrel; a reciprocating non-revolving feeding means for forcing a carton over said mandrel; means to expand said mandrel after it has received said carton; and a non-revolving crimping means adapted to act on said carton while said mandrel is in its expanded condition, substantially as described.

10. In a machine for crimping cartons, the combination of an expansible mandrel; a reciprocating feeding means comprising a rack for forcing a carton over said mandrel; means comprising a cam ring to expand said mandrel after it has received said carton; and a crimping means comprising a revolving and reciprocating disk adapted to act on said carton while said mandrel is in its expanded condition, substantially as described.

11. In a machine for crimping cartons, the combination of a means for supplying the cartons; a revolving expansible mandrel; non-revolving means for forcing said cartons over said mandrel; means for expanding the mandrel after receiving the carton; a rotating, non-revolving crimping means adapted to act on said carton while on said mandrel; and non-revolving means for sliping the carton off of the mandrel after the crimping operation is completed, substantially as described.

12. In a machine for crimping cartons, the combination of a means for supplying the cartons; a revolving mandrel; means comprising a reciprocating rack and a feeder bar carried by said rack for forcing said cartons over said mandrel; a crimping means adapted to act on said carton while on said mandrel; means to cause said mandrel to carry said carton into position to be acted upon by said crimping means; means to lock said mandrel in said crimping position; and means for slipping the carton off of the mandrel after the crimping operation is completed, substantially as described.

13. In a machine for crimping cartons, the combination of a mandrel; means to force cartons on said mandrel comprising a rack; a feeder bar carried by said rack; and a yielding connection between said bar and said rack, substantially as described.

14. In a machine for crimping cartons, the combination of an expansible mandrel; means to expand said mandrel; means to receive cartons with which said mandrel is adapted to register; means to force cartons on said mandrel comprising a rack; a feeder bar carried by said rack; and a yielding connection between said bar and said rack, substantially as described.

15. In a machine for crimping cartons, the combination of an expansible mandrel adapted to receive cartons; a non-revolving reciprocating means adapted to force cartons over said mandrel when the later is in its collapsed condition; intermittent means for revolving said mandrel to predetermined positions; means to expand said mandrel during its revolving movements; non-revolving means for crimping the cartons carried by said mandrel when in one of said positions; and means for rotating and reciprocating said crimping means timed with the movements of said mandrel, substantially as described.

16. In a machine for crimping cartons, the combination of an expansible mandrel adapted to receive cartons; a non-revoluble reciprocating means adapted to force cartons over said mandrel while in its collapsed condition; intermittent means for revolving said mandrel to and locking the same in predetermined positions; means to expand said mandrel after receiving said cartons and while moving to one of said positions; non-revolving means for crimping the cartons carried by said mandrel while locked in one of said positions; and means timed with the movements of said mandrel for reciprocating and rotating said crimping means, substantially as described.

17. In a machine for crimping cartons, the combination of an expansible mandrel adapted to receive cartons; a non-revoluble reciprocating means adapted to force cartons over said mandrel while in its collapsed condition; a rack and gears for operating said reciprocating means; intermittent means comprising a power shaft and a train of gears driven thereby for revolving said mandrel to and locking the same in predetermined positions; means comprising a reciprocating shaft and radially movable wedges to expand said mandrel after receiving said cartons and while moving to one of said positions; non-revolving means for crimping the cartons carried by said mandrel while locked in one of said positions; and means timed with the movements of said mandrel for reciprocating and rotating said crimping means, substantially as described.

18. In a machine for crimping cartons, the combination of a power shaft; a train of gears driven thereby; a crimping disk rotated by said gears; a second train of gears operated by said power shaft; connections between said second train of gears and said crimping disk; means by which said disk is given a transverse movement while being moved by said second train of gears; a plurality of mandrels adapted to carry cartons; and means causing said mandrels to move said cartons into successive registering engagements with said crimping disk, substantially as described.

19. In a machine for crimping cartons, the combination of a power shaft; a crimping disk; connections between said shaft and said disk for rotating the same; connections with said shaft for moving the disk transversely of its plane; a plurality of cylindrical expanding mandrels adapted to move cartons successively into register with said crimping disk; a rack for feeding said cartons to said mandrels when in their collapsed condition; means for expanding said mandrels after said cartons have been placed thereon; and connections between said power shaft and said rack, substantially as described.

20. In a machine for crimping cartons, the combination of a power shaft; a crimping disk; connections between said shaft and said disk for rotating the same; connections with said shaft for moving the disk transversely of its plane; a plurality of expansible mandrels adapted to move cartons successively into register with said crimping disk; a rack for feeding said cartons to said mandrels; means for expanding said mandrels after they have received said cartons; connections between said power shaft and said rack; and a heating means for raising the temperature of said disk while operating on said cartons, substantially as described.

21. In a machine for crimping cartons, the combination of a plurality of rotating and transversely reciprocating crimping disks; gears for rotating said disks; gears and cams for intermittently reciprocating said disks; a plurality of intermittently revolving expansible mandrels adapted to cause cartons to register at intervals with said disks; and means to feed said cartons to said mandrels, substantially as described.

22. In a machine for crimping cartons, the combination of a plurality of intermittently rotating and transversely reciprocating crimping disks; a plurality of intermittently expanding and revolving mandrels adapted to cause cartons to register at intervals with said disks; means to revolve said mandrels; means to expand said mandrels at intervals; means to feed said cartons to said mandrels; and means to strip said cartons from said mandrels, substantially as described.

23. In a machine for crimping cartons, the combination of intermittently revolving mandrels; reciprocating means for feeding cartons to said mandrels; rotating and transversely moving crimping disks adapted to receive said cartons; gears and cams for intermittently reciprocating said disks; means for heating said disks; and reciprocating means for stripping said cartons from said mandrels; substantially as described.

24. In a machine for crimping cartons, the combination of expansible intermittently revolving mandrels; reciprocating means for feeding cartons to said mandrels; means for expanding said mandrels after said cartons are fed thereon; intermittently revolving and transversely moving crimping disks adapted to successively receive said cartons; means for heating said disks; and reciprocating yielding means for stripping said cartons from said mandrels, substantially as described.

In testimony whereof, I affix my signature, in presence of two witnesses.

GEORGE W. BEADLE.

Witnesses:
J. H. GEWECKE,
C. A. WILTSEE.